US009260899B2

(12) United States Patent
Loeffler et al.

(10) Patent No.: US 9,260,899 B2
(45) Date of Patent: Feb. 16, 2016

(54) DRIVE DEVICE FOR A HATCH OF A MOTOR VEHICLE

(71) Applicant: Brose Fahrzeugteile GmbH & Co. KG, Hallstadt, Hallstadt (DE)

(72) Inventors: Linda Loeffler, Lake Orion, MI (US); Sebastian Heinze, Sachsenbrunn (DE); Alwin Macht, Ebensfeld (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 335 days.

(21) Appl. No.: 14/020,090

(22) Filed: Sep. 6, 2013

(65) Prior Publication Data

US 2015/0069869 A1 Mar. 12, 2015

(51) Int. Cl.

| E05F 1/10 | (2006.01) |
|---|---|
| E05F 15/603 | (2015.01) |
| E05F 15/12 | (2006.01) |
| F16H 25/20 | (2006.01) |
| H02K 7/10 | (2006.01) |
| E05F 15/622 | (2015.01) |
| E05F 15/611 | (2015.01) |

(52) U.S. Cl.
CPC .............. *E05F 1/1041* (2013.01); *E05F 15/124* (2013.01); *E05F 15/622* (2015.01); *F16H 25/20* (2013.01); *H02K 7/10* (2013.01); *E05F 15/611* (2015.01); *E05Y 2800/122* (2013.01); *E05Y 2800/406* (2013.01); *E05Y 2800/424* (2013.01); *Y10T 74/18576* (2015.01)

(58) Field of Classification Search
CPC .............. B60J 5/10; B60J 5/101; B60J 5/106; E05F 1/002; E05F 1/08; E05F 1/10; E05F 1/1025; E05F 1/1041; E05F 1/105; E05F 1/1091; E05F 5/06; E05F 15/611; E05F 15/622; E05F 15/60; E05F 15/603; E05F 15/616; F16H 25/20; F16H 25/24
USPC ...................... 296/56, 146.4, 146.9; 74/89.23
See application file for complete search history.

(56) References Cited

U.S. PATENT DOCUMENTS

| 4,558,837 A | 12/1985 | Mens et al. | |
|---|---|---|---|
| 7,802,664 B2 * | 9/2010 | Hanna ................... | E05F 15/622 188/265 |
| 8,393,237 B2 * | 3/2013 | Arenz ................... | E05F 15/622 74/89.23 |
| 2007/0137331 A1 * | 6/2007 | Kachouh ............. | F16H 25/2056 74/89.23 |

(Continued)

OTHER PUBLICATIONS

PCT International Search Report and Written Opinion, International Application No. PCT/EP2014/066302, mailed Oct. 17, 2014, 8 pages.

*Primary Examiner* — Jason S Daniels
(74) *Attorney, Agent, or Firm* — Pauly, Devries, Smith & Deffner, LLC (57) ABSTRACT

The invention relates to a drive device for a hatch of a motor vehicle, wherein the drive device comprises two drive sections that are linearly moveable relative to each other between a retracted position and an extended position, wherein the drive sections are spring biased against each other into the extended position by a spring arrangement, wherein an end stop is provided to limit the drive motion between the drive sections to the extended position. It is proposed that the end stop comprises a damping arrangement with a deformation zone, wherein during a drive motion into the end stop, depending on the speed of the drive motion, the damping arrangement damps the drive motion mainly based on plastic deformation of the deformation zone.

20 Claims, 5 Drawing Sheets

(56) References Cited

U.S. PATENT DOCUMENTS

| | | |
|---|---|---|
| 2007/0138722 A1 | 6/2007 | Hanna et al. |
| 2008/0060273 A1* | 3/2008 | Bochen ............... E05F 15/622 49/340 |
| 2008/0196525 A1* | 8/2008 | Bohlen ............... F16H 25/2015 74/89.37 |
| 2011/0271595 A1 | 11/2011 | Eggeling et al. |
| 2012/0021092 A1* | 1/2012 | Sibbesen ............... C12N 9/248 426/28 |

* cited by examiner

DRIVE DEVICE FOR A HATCH OF A MOTOR VEHICLE

FIELD OF THE INVENTION

The invention is directed to a drive device for a hatch of a motor vehicle and to a hatch arrangement.

BACKGROUND

The expression "hatch" is to be understood in a broad sense. Those hatches include tail gates, boot lids, engine bonnets, doors, in particular side doors, load-space floors or the like of a motor vehicle.

The drive device in question has gained increasing importance in the last years in order to provide a high level of comfort for the user. This is especially true for large hatches of a motor vehicle, which weight make it hard to manually perform an opening motion or a closing motion of the hatch.

In a first alternative known from the state of the art the drive device is at least partly motor driven and accordingly comprises an electric motor and a gear mechanism to generate a bidirectional drive motion. Here, a spring arrangement supports the electric motor, as shown in US 2011/271595 A1 for an example. A certain damping of the drive motion is provided by the friction inside the drive train of the drive device.

In a second alternative known from the state of the art the drive device is solely spring driven and serves as a support of the hatch against the forces of gravity. Such drive device normally comprises a spring arrangement and a damping arrangement in the design of a gas damper, which is a comparably costly setup for an only spring driven device. In most cases such a drive device generates a drive motion in an opening direction of the hatch only.

In both above noted alternatives of known drive devices a spring arrangement is integrated into the drive device, which spring arrangement provides spring forces of considerable magnitude. Those high spring forces generally include a risk of material damage or even the injury of persons.

If, for example, the connection between the drive device and the hatch breaks, the spring arrangement could relax impulse like caused by its high spring forces leading to an enormous impact when reaching an end position of the drive device. The resulting impact energy may be high enough to break the structure of the drive device, possibly freeing the spring arrangement with a resulting risk of damage.

Another risky situation can arise when the hatch is being opened manually by a user with extreme opening forces and correspondingly opening speeds. In such a misuse situation the above noted, high impact energy is generated when reaching the respective end position of the hatch, again leading to the risk of damage.

In order to guarantee a sufficient operational safety, the above noted, risky situations require an effective and systematic damping especially of those drive motions, that are taking place with exceptionally high speeds. With the known approaches this leads to a costly setup of the respective drive device.

It is the object of the invention to improve the known drive devices such that a high operational safety may be realized with low costs.

SUMMARY OF THE INVENTION

The above noted object is solved by a drive device for a hatch of a motor vehicle, wherein the drive device comprises two drive sections that are linearly moveable relative to each other between a retracted position and an extended position, wherein the drive sections are spring biased against each other into the extended position by a spring arrangement, wherein an end stop is provided to limit the drive motion between the drive sections to the extended position, wherein the end stop comprises a damping arrangement with a deformation zone, and wherein during a drive motion into the end stop, depending on the speed of the drive motion, the damping arrangement damps the drive motion mainly based on plastic deformation of the deformation zone.

The idea underlying the invention is to perform a damping function based on plastic deformation for certain drive motions when reaching the extended position. It has been found that with a predefined plastic deformation an effective and predetermined absorption of the impact energy is possible, which impact energy is converted into plastic deformation.

In further detail the teaching is directed to a drive device for a hatch of a motor vehicle, which drive device comprises two drive sections that are linearly movable relative to each other between a retracted position and an extended position. The two drive sections of the drive device are spring biased against each other into the extended position by a spring arrangement. This allows, for example, a support of the opening movement of the hatch.

In order to limit the drive motion to the extended position an end stop is provided. It is of particular importance that the end stop further comprises a damping arrangement with a deformation zone. During a drive motion into the end stop, depending on the speed of the drive motion, the damping arrangement damps the drive motion mainly based on plastic deformation of the deformation zone.

By converting a good amount of the impact energy into plastic deformation energy, only few energy is left for the deformation of other components of the drive device like connectors or the like. As a result the operational safety in an extraordinary situation like a misuse situation is considerably increased.

The proposed solution allows a good control of the plastic deformation and therewith of the damping characteristic as the plastic deformation is taking place in a deformation zone which is particularly designed for a certain deformation characteristic. In addition, the damping characteristic may be realized with low costs and may even be varied with low constructional effort.

The dimensioning of the damping arrangement is of particular importance for the invention. According to an embodiment, the dimensioning is such that for a drive motion with a speed that is above a predetermined speed-threshold the damping arrangement damps the drive motion mainly based on plastic deformation of the deformation zone. It has been found that a drive motion with exceptionally high speed may not effectively be damped based on the loss of energy that in practice goes along with elastic deformation. The swing back motion due to the elasticity would lead to unintended motion with, again, the risk of damage.

However, damping based on elastic deformation may be suitable for a drive motion with low speed. According to an embodiment, it is proposed that the damping of the drive motion mainly goes back on elastic deformation for a drive motion with a speed that is below a predetermined threshold.

Some embodiments can be directed to a number of constructional solutions for the proposed drive device. According to some embodiments the damping zone is provided by a damping element which may, for example, be a bushing. Such a solution may be realized based on standard components, which is particularly cost effective. An embodiment, proposes to integrate the deformation zone into a component which, which may also serve as a drive component of the drive device. This is a second possibility to realize the proposed solution with high cost effectiveness.

Another embodiment is directed to a hatch arrangement of a motor vehicle with a hatch and a proposed drive device, such as the device discussed above. Regarding advantages and variants reference may be made to the explanations given for the proposed drive device.

An embodiment is directed to a particularly interesting setup of a hatch arrangement with two drive devices, one drive device being solely spring driven and the other drive device being at least partly motor driven. It may, for example, be interesting to have one drive device arranged at one side of the hatch and the other drive device arranged on the opposite side of the hatch. In an embodiment, only one of the drive devices, namely the solely spring driven device, comprises an above noted end stop with a damping arrangement, which increases the constructional flexibility and the costs, especially as far as the motor driven device is concerned.

In one embodiment, the invention provides a drive device for a hatch of a motor vehicle, wherein the drive device comprises two drive sections that are linearly moveable relative to each other between a retracted position and an extended position, wherein the drive sections are spring biased against each other into the extended position by a spring arrangement, wherein an end stop is provided to limit the drive motion between the drive sections to the extended position, wherein the end stop comprises a damping arrangement with a deformation zone, wherein during a drive motion into the end stop, depending on the speed of the drive motion, the damping arrangement damps the drive motion mainly based on plastic deformation of the deformation zone.

In an embodiment, the damping arrangement damps the drive motion mainly based on plastic deformation of the deformation zone for a drive motion with a speed that is above a predetermined speed-threshold, such as above the speed range of the drive motion for normal operation.

In an embodiment, the damping arrangement damps the drive motion mainly based on elastic deformation of the deformation zone for a drive motion with a speed that is below a predetermined speed-threshold, such as within the speed range for normal operation.

In an embodiment, the damping arrangement damps at least part of the drive motion into the end stop, that is generated by the drive device itself, mainly based on plastic deformation of the deformation zone.

In an embodiment, the plastic deformation of the deformation zone leaves the functioning of the drive device in view of driving the hatch unaffected.

In an embodiment, the drive device is non-self-locking such that the drive motion may be induced manually by a user acting on the hatch.

In an embodiment, the spring arrangement comprises a coil compression spring that urges the drive sections into the extended position.

In an embodiment, the drive device is solely spring driven, or, that the drive device is at least partly motor driven and comprises an electric motor and a gear mechanism. In an embodiment, the gear mechanism is a spindle-spindle nut gear mechanism.

In an embodiment, one drive section comprises a tube and the other drive section comprises a rod, wherein the rod is in sliding and/or screwing engagement with the inside of the tube. In an embodiment, the rod comprises a slider for the sliding engagement with the tube.

In an embodiment, the rod is the spindle of the spindle-spindle nut gear mechanism.

In an embodiment, the deformation zone is provided by a damping element that is plastically deformable by a drive motion for damping. In an embodiment, the damping element is at least partly made of a foam material. In an embodiment, a plastic foam material, in particular a polyurethane (PUR) foam material, or an aluminum foam material can be included.

In an embodiment, the damping element is designed as a bushing, that is plastically deformable along its axial extension by a drive motion for damping. In an embodiment, the rod extends through the bushing with play remaining between the rod and the bushing.

In an embodiment, the deformation zone is an axial section of the tube or the rod, which axial section is plastically deformable by the engagement between the tube and the rod during a drive motion into the end stop. In an embodiment, the tube provides a deformation zone with a deformation arrangement, which deformation arrangement is plastically deformable by an engagement with the rod. In an embodiment, the deformation arrangement comprises at least one axially extending rib.

In an embodiment, the device can comprise a hatch arrangement wherein the hatch arrangement of a motor vehicle with a hatch and a drive device for driving the hatch.

In an embodiment, the drive device is solely spring driven and that an additional drive device is provided which is at least partly motor driven and which comprises an electric motor and a gear mechanism acting in an opening direction and/or a closing direction of the hatch. In an embodiment, only the spring driven device comprises an end stop with a damping arrangement, which end stop is assigned to the extended position.

BRIEF DESCRIPTION OF THE FIGURES

In the following the invention will be explained in the drawings referring to embodiments.

DETAILED DESCRIPTION

The proposed drive device 1 is assigned to a hatch 2 of a motor vehicle. Regarding the broad interpretation of the expression "hatch" reference is made to the introductory part of the specification.

Figure 2:
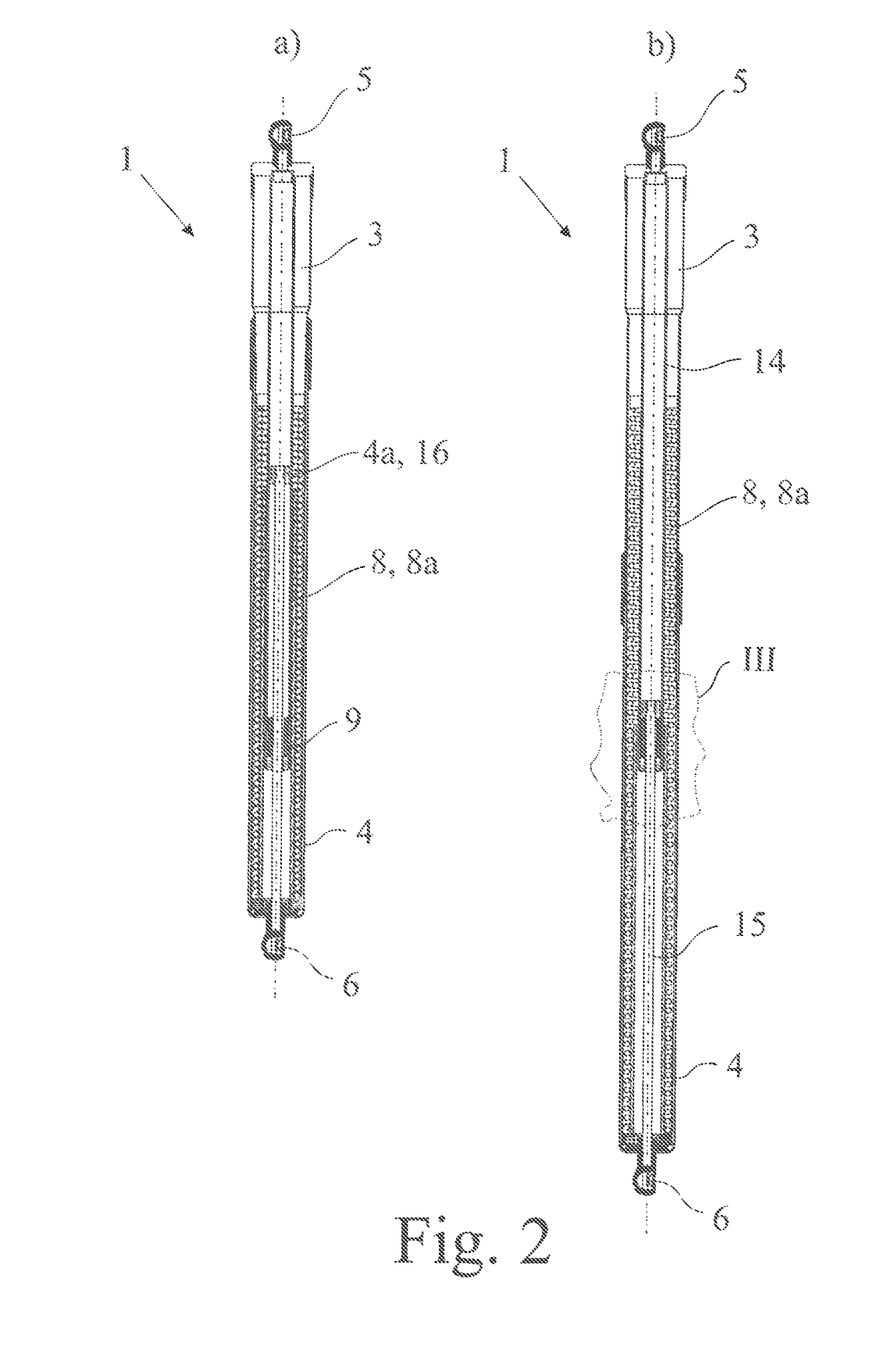
FIG. 2 shows the drive device according to FIG. 1 in a sectional side view a) in the retracted position and b) in the extended position.

The drive device 1 comprises two drive sections 3, 4 that are linearly movable relative to each other between a retracted position (FIG. 2a) and an extended position (FIG. 2b). The expression "position" here describes the position of the two drive sections 3, 4 relative to each other. Each drive section 3, 4 is provided with a connector 5, 6 for the connection to the hatch 2 and the body 7 of the motor vehicle. As shown in FIG. 2, those connectors 5, 6 are designed as ball sockets that may be engaged with respective ball heads.

The two drive sections 3, 4 are spring biased against each other into the extended position (FIG. 2b) by a spring arrangement 8. The drive device 1 shown in FIG. 2 is solely spring driven by the spring arrangement 8 as will be explained later in more detail.

Figure 3:
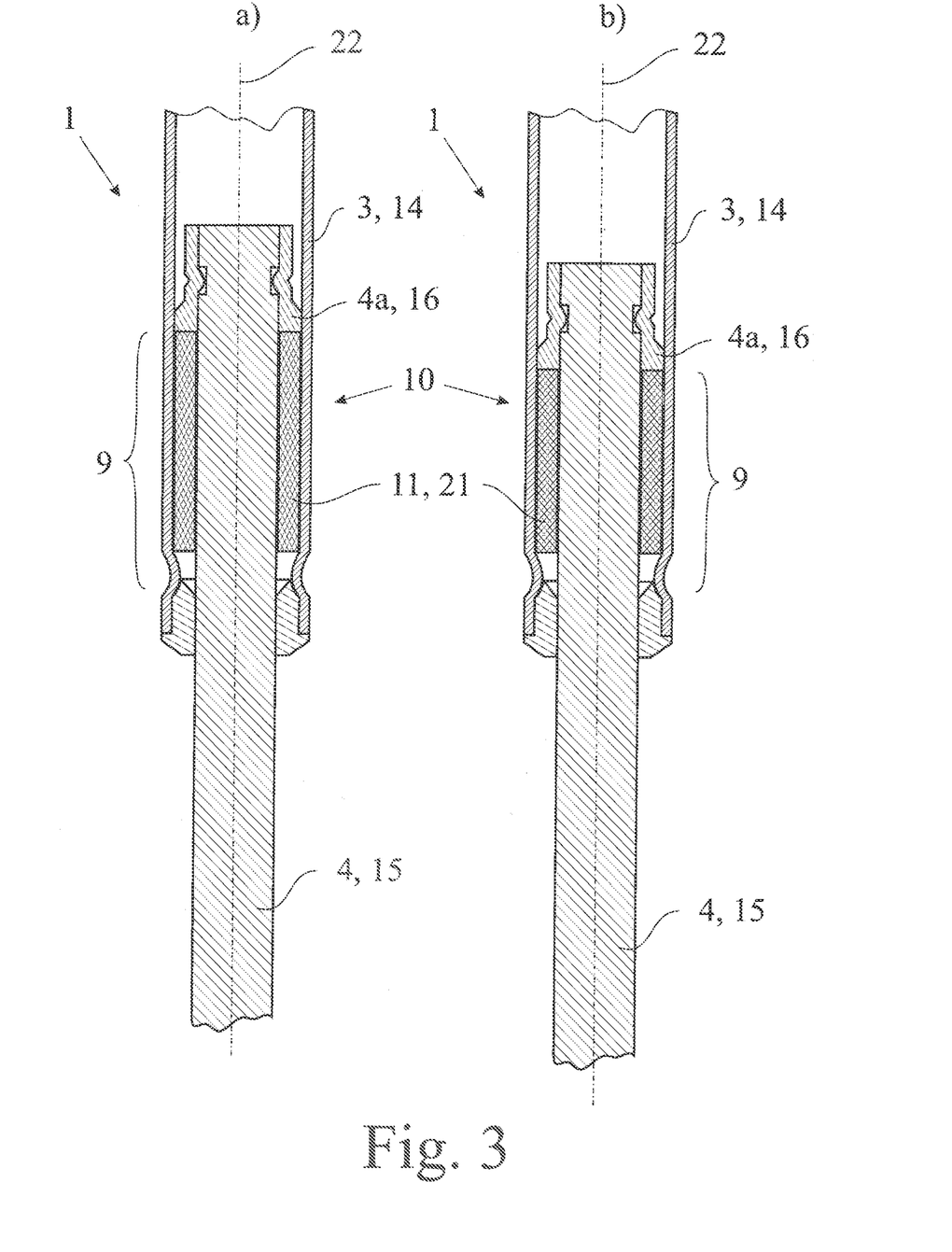
FIG. 3 shows the drive device according to FIG. 2 in a detail view III in two states a) in the extended position before plastic deformation of the deformation zone and b) during plastic deformation of the deformation zone.

FIG. 3 shows that the drive device 1 comprises an end stop 9 to limit the drive motion to the extended position. In other words the end stop 9 blocks the drive sections 3, 4 from moving beyond the extended position.

It is of particular importance for the present invention that the end stop 9 comprises a special damping arrangement 10 with a deformation zone 11. During a drive motion into the end stop 9, depending on the speed of the drive motion, the damping arrangement 10 damps the drive motion mainly based on plastic deformation of the deformation zone 11.

As shown in FIG. 2, a drive motion into the end stop 9 corresponds to moving the two drive sections 3, 4 into the extended position shown in FIG. 2b. FIG. 3a shows that in this extended position the end stop 9, which is connected to the first drive section 3, is in blocking engagement with a component 4a of the second drive section 4. Accordingly during a drive motion into the end stop 9 an impact occurs between the drive sections 3, 4, here between the component 4a and the end stop 9.

If the speed of the drive motion into the end stop 9 is above a predetermined speed-threshold, the damping arrangement 10 damps the drive motion mainly based on plastic deformation of the deformation zone 11. In an embodiment, the speed-threshold is above the speed range of the drive motion for normal operation.

For drive motion into the end stop 9 with lower speeds, in an embodiment, damping of the drive motion based on elastic deformation of the deformation zone 11 is proposed. In this context it is to be understood that such elastic deformation generally goes along with loss of kinematic energy, which mainly goes back on internal friction of the deformation zone 11. In addition the elastic deformation of the deformation zone 11 leads to an expansion of the impact between the two drive sections 3, 4 in the time domain. This means that the kinematic energy of the drive motion is being converted into potential elastic energy within a relative large time interval which in the end means that the resulting forces acting between the drive sections 3, 4 during the—expanded—impact are comparably low. For such low speeds the subsequent swing back motion is not critical.

Accordingly, the damping arrangement 10 damps the drive motion into the end stop 9 mainly based on elastic deformation of the deformation zone 11, if the speed of the drive motion is below a predetermined speed-threshold. In an embodiment, the speed, which leads to damping based on elastic deformation, is within the speed range for normal operation.

The above noted combination of plastic deformation and elastic deformation based on the speed of the drive motion may be realized by a corresponding geometry, structure and material of the deformation zone.

The drive motion with high speed which is being damped mainly based on plastic deformation may go back on misuse situations as noted above, induced by user operation. Such drive motion may, however, also be generated by the drive device 1 itself. An example would be the breakage of a connector 4, 5 and the resulting, impulse like expansion of the spring arrangement 8. Accordingly, the damping arrangement 10 damps at least part of the drive motion into the end stop 9, that is generated by the drive device 1 itself, mainly based on plastic deformation of the deformation zone 11 as noted above.

Especially interesting is the fact that the plastic deformation only takes place in the deformation zone 11 of the damping arrangement 10. With this it can be guaranteed that the plastic deformation of the deformation zone 11 leaves the functioning of the drive device 1 in view of the driving interaction with the hatch 2 of the motor vehicle unaffected. This is to be seen in contrast to a possible, predetermined breaking point in one of the connectors 4, 5 for the protection of drive components.

Here the drive device 1 is non-self-locking such that the drive motion may be induced manually by a user acting on the hatch 2, which increases the flexibility for the user on the one hand, but generally opens the door for possible, above noted misuse situations on the other hand.

Figure 1:
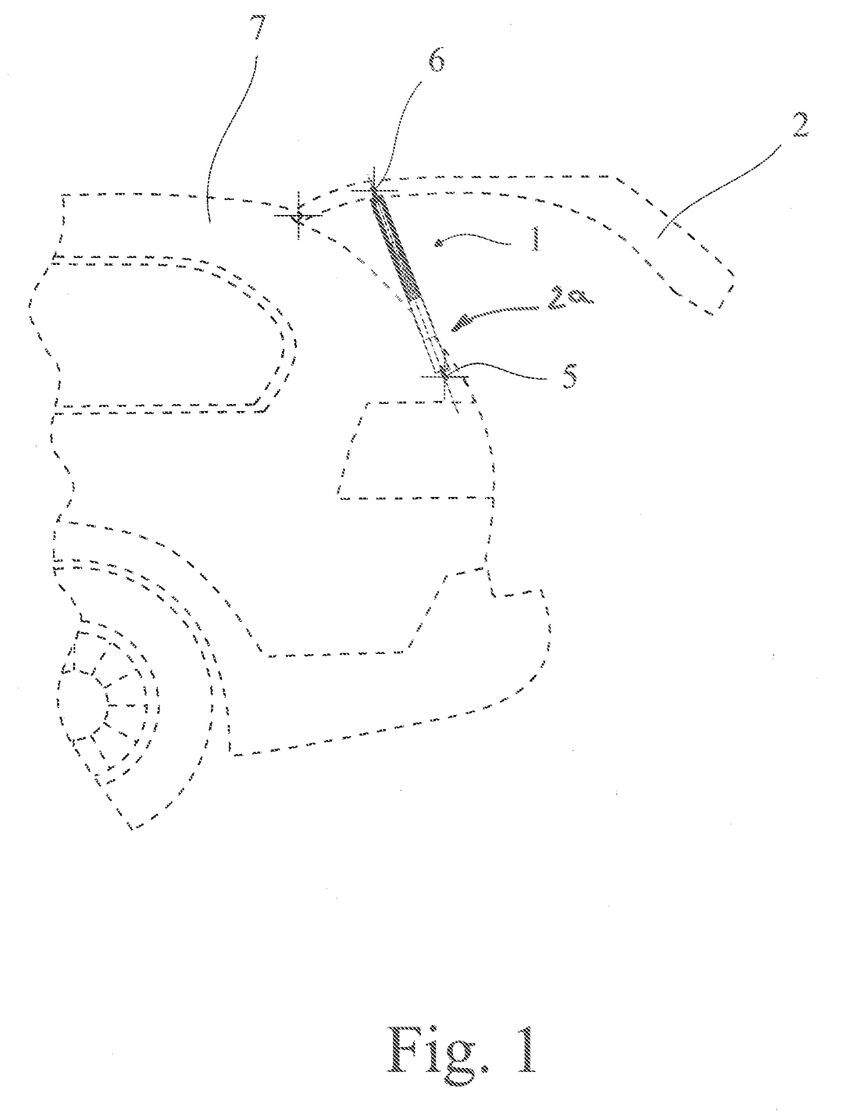
FIG. 1 shows the back section of a motor vehicle comprising a proposed hatch arrangement with a proposed drive device.
Figure 4:
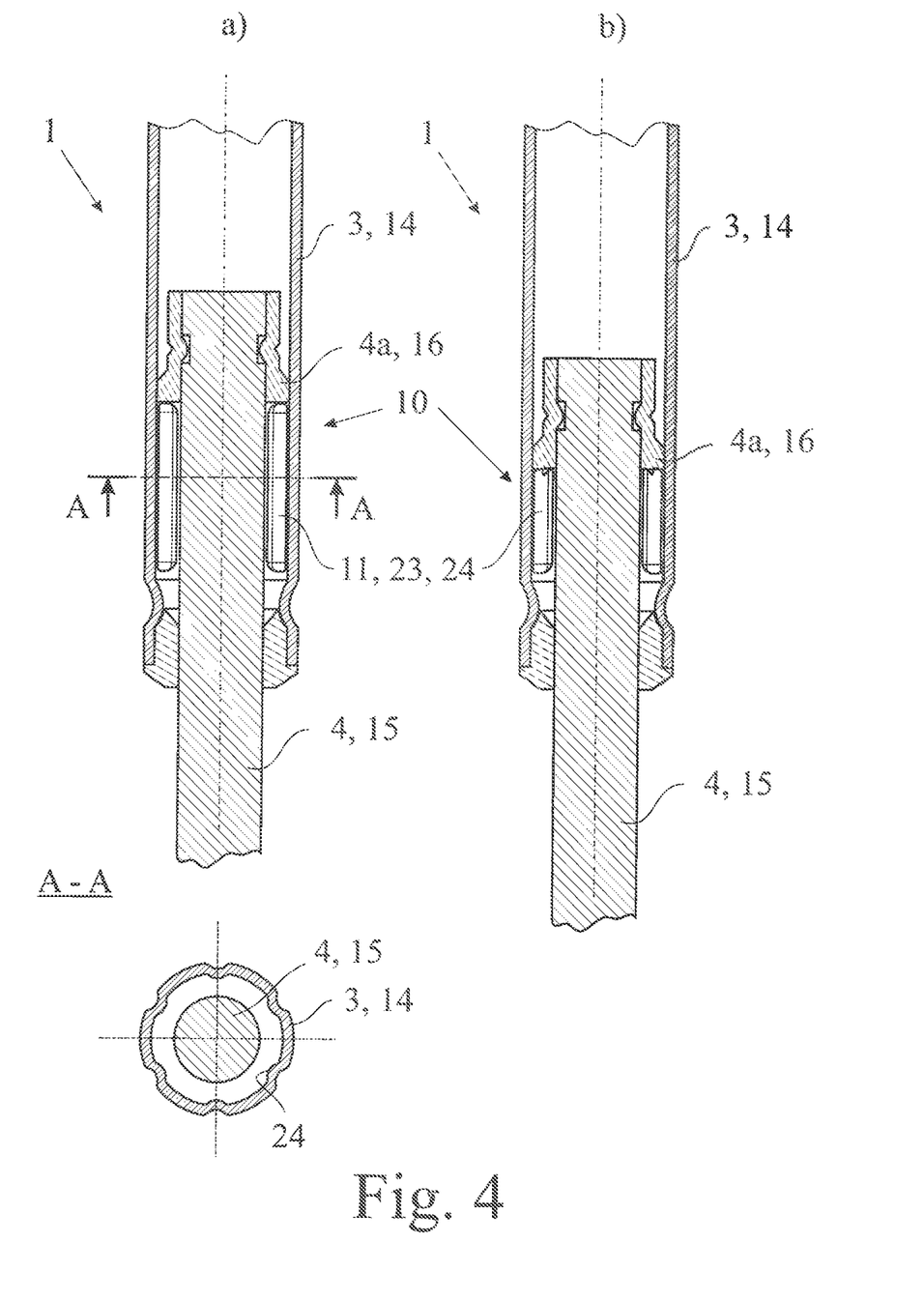
FIG. 4 shows a second embodiment of the drive device according to FIG. 2 in a detail view III in two states a) in the extended position before plastic deformation of the deformation zone and b) during plastic deformation of the deformation zone and FIG. 5 shows another embodiment for a proposed drive device in the retracted position.

For the realization of the spring arrangement 8 a number of advantageous solutions are possible. The embodiments shown in the drawings display a spring arrangement 8 that comprises a coil compression spring 8a that urges the drive sections 3, 4 into the extracted end position. The application of a coil compression spring 8a for the drive device 1 leads to a very compact structure, if the coil compression spring 8a is aligned to the direction of the linear drive motion between the drive sections 3, 4. The embodiments for the drive devices 1 shown in FIGS. 2 to 4 are solely spring driven devices acting in an opening direction or a closing direction of the hatch 2. In particular if the hatch 2 is a liftgate as shown in FIG. 1 the spring driven device 1 acts in an opening direction of the hatch 2 in order to support the hatch 2 against the forces of gravity.

Figure 5:
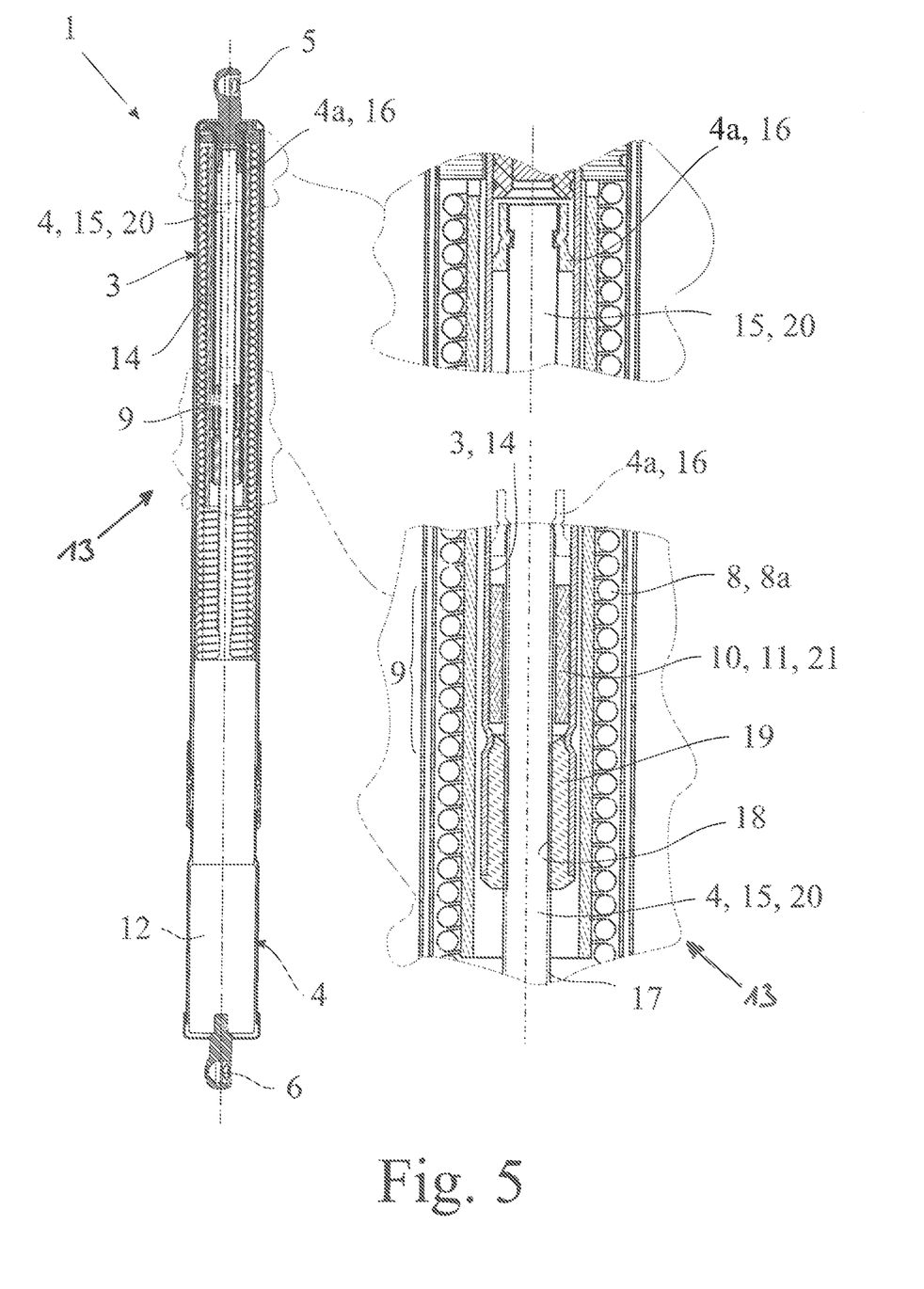

The drive device 1 shown in FIG. 5 is partly motor driven and comprises an electric motor 12 and a gear mechanism 13 acting in an opening direction and/or in a closing direction of the hatch 2. Here the drive device 1 is designed as a bidirectional drive device 1 that provides a motorized support of the hatch 2 in the closing direction as well as in the opening direction. The spring arrangement 8 supports the electric motor 12 by acting onto the hatch 2 in the opening direction.

The motor driven device 1 is of slim design which mainly goes back on the gear mechanism 13 being a spindle-spindle nut gear mechanism. As a result the drive device 1 is designed as a spindle drive.

Comparing the spring driven device 1 shown in FIG. 2 and the motor driven device shown in FIG. 5 it becomes apparent that the overall structure of the drive devices 1 is similar. This is true especially for the construction of the drive sections 3, 4 with connectors 5, 6.

In all embodiments shown one drive section 3 comprises a tube 14 and the other drive section 4 comprises a rod 15. The rod 15 is in sliding (FIG. 2) and/or screwing (FIG. 5) engagement with the inside of the tube 14. In all embodiments shown the rod 15 comprises a slider 16 for the sliding engagement with the tube 14. The slider 16 together with the tube 14 serve as a guide for the rod 15.

While the embodiments shown in FIGS. 2 to 4 show a solely sliding engagement between the rod 15 and the tube 14, FIG. 5 also shows a screwing engagement between the rod 15 and the tube 14. For this screwing engagement the rod 15 is provided with an outer screw thread 17, while the tube 14 is provided with inner screw thread 18, which is part of a spindle nut 19. The rod 15, accordingly, is designed as a spindle 20 of the spindle-spindle nut gear mechanism 13.

There are various advantageous possibilities for the design of the deformation zone 11. The deformation zone 11 shown in FIG. 3 is provided by a damping element 21 that is plastically deformable by a driving motion for damping, as shown in FIG. 3b. Here the damping element 21 is at least partly made of a foam material, such as a plastic foam material, or a polyurethane (PUR) material. As an alternative, an aluminum foam material may well be applied for the damping element 21.

It may be taken from FIG. 3 that the damping element 21 is designed as a separate part. This allows easy manufacturing. It is then also generally possible to replace the damping element 21 if the above noted plastic deformation has taken place.

The damping element 21 may also be a two or more component element, wherein, for example, one component mainly provides the plastic deformation, while another part mainly provides the elastic deformation.

In an embodiment shown in FIG. 3 the damping element 21 is designed as a bushing that may be plastically deformed along its axial extension 22 for damping. As also shown in FIG. 3 the above noted rod 15 extends though the bushing 21 with play remaining between the rod 15 and the bushing 21.

The above noted plastic deformation is shown in FIG. 3b. The damping of the drive motion by plastic deformation is a very effective measure to absorb the kinematic energy which goes back on the drive motion. As this plastic deformation is only foreseen for extraordinary situations as a misuse situation it is well tolerable that a plastic and therefore irreversible deformation takes place. The plastic deformation may also be used as a proof that a misuse situation has actually taken place, for example, when deciding about warranty claims.

FIG. 4 shows an alternative for the realization of the deformation zone 11. Here the deformation zone 11 is an axial section of the tube 14 or the rod 15, which axial section is basically deformable by the engagement between the tube 14 and the rod 15 during a drive motion into the end stop 9.

FIG. 4a shows that the tube 14 provides a deformation zone 11 with a deformation arrangement 23, which deformation arrangement 23 may be basically deformed by an engagement with the rod 15, in further detail with the slider 16 of the rod 15. Constructionally the deformation arrangement 23 disclosed in FIG. 4 is realized as a number of axially extendings ribs 24, as may be taken from sectional view A-A of FIG. 4a. When a plastic deformation of the deformation arrangement 23 occurs, the rod 15, in particular the slider 16, may be stuck in the deformation arrangement 23, which again may serve as a proof for a misuse situation. In any case such proof may be seen in the deformation of the ribs 24 as well.

The embodiments for the deformation zone 11 may well be applied to the drive device shown in FIG. 5, taking into account that the rod 15 corresponds to the spindle 20.

According to another teaching the hatch arrangement of a motor vehicle with an above noted hatch 2 and an above noted drive device 1 is claimed as such. Insofar reference is made to all explanations given with regard to the hatch 2 and the drive device 1.

As shown in FIG. 1 the hatch 2 serves for closing an opening 2a in the motor vehicle body 7. The drive device 1 is arranged sideways of the opening 2a. In an embodiment, two proposed drive devices 1 are provided on opposite sides of the opening 2a of the motor vehicle body 7.

In an embodiment one drive device 1 of the hatch arrangement is solely spring driven. In addition another drive device 1 is provided which is at least partly motor driven and which comprises an electric motor 12 and a gear mechanism 13 acting in an opening direction and/or a closing direction of the hatch 2.

In an embodiment, both drive devices 1 are drive devices according to the first teaching. Alternatively, only one of the drive devices 1 is designed according to the first teaching. In this respect it is proposed that only the solely spring driven device 1 comprises an end stop 9 with a damping arrangement 10, which end stop 9 is assigned to the extended position. With this combination of drive devices it is especially advantageous that the motorized drive device may be designed independently from the end stop 9, as the end stop 9 is only arranged at the other, solely spring driven device 1.

The invention claimed is:

1. A drive device for a hatch of a motor vehicle, wherein the drive device comprises two drive sections that are linearly moveable relative to each other between a retracted position and an extended position;
    wherein the drive sections are spring biased against each other into the extended position by a spring arrangement;
    wherein an end stop is provided to limit the drive motion between the drive sections to the extended position; and
    wherein the end stop comprises a damping arrangement with a deformation zone, wherein during a drive motion into the end stop, depending on the speed of the drive motion, the damping arrangement damps the drive motion mainly based on plastic deformation of the deformation zone, wherein the plastic deformation of the deformation zone leaves the functioning of the drive device in view of driving the hatch unaffected.

2. The drive device according to claim 1, wherein the damping arrangement damps the drive motion mainly based on plastic deformation of the deformation zone for a drive motion with a speed that is above a predetermined speed-threshold.

3. The drive device according to claim 2, wherein the predetermined speed-threshold is above the speed range of the drive motion for normal operation.

4. The drive device according to claim 1, wherein the damping arrangement damps the drive motion mainly based on elastic deformation of the deformation zone for a drive motion with a speed that is below a predetermined speed-threshold.

5. The drive device according to claim 4, wherein the predetermined speed-threshold, is within the speed range for normal operation.

6. The drive device according to claim 1, wherein the damping arrangement damps at least part of the drive motion into the end stop, that is generated by the drive device itself, mainly based on plastic deformation of the deformation zone.

7. The drive device according to claim 1, wherein the drive device is non-self-locking such that the drive motion may be induced manually by a user acting on the hatch.

8. The drive device according to claim 1, wherein the spring arrangement comprises a coil compression spring that urges the drive sections into the extended position.

9. The drive device according to claim 1, wherein the drive device is solely spring driven, or, that the drive device is at least partly motor driven and comprises an electric motor and a gear mechanism.

10. The drive device according to claim 9, wherein the gear mechanism is a spindle-spindle nut gear mechanism.

11. The drive device according to claim 1, wherein one drive section comprises a tube and the other drive section comprises a rod, wherein the rod is in sliding and/or screwing engagement with the inside of the tube.

12. The drive device according to claim 11, wherein the rod is a spindle of a spindle-spindle nut gear mechanism.

13. The drive device according to claim 11, wherein the rod comprises a slider for the sliding engagement with the tube.

14. The drive device according to claim 1, wherein the deformation zone is provided by a damping element that is plastically deformable by a drive motion for damping.

15. The drive device according to claim 14, wherein the damping element is designed as a bushing, that is plastically deformable along its axial extension by a drive motion for damping.

16. The drive device according to claim 15, wherein a rod extends through the bushing with play remaining between the rod and the bushing.

17. The drive device according to claim 1, wherein the deformation zone is an axial section of the tube or the rod, which axial section is plastically deformable by the engagement between the tube and the rod during a drive motion into the end stop.

18. The drive device according to claim 1, comprising a hatch arrangement wherein the hatch arrangement of a motor vehicle with a hatch and a drive device for driving the hatch.

19. The drive device according to claim 18, wherein the drive device is solely spring driven and that an additional drive device is provided which is at least partly motor driven and which comprises an electric motor and a gear mechanism acting in an opening direction and/or a closing direction of the hatch, which end stop is assigned to the extended position.

20. A drive device for a hatch of a motor vehicle, wherein the drive device comprises two drive sections that are linearly moveable relative to each other between a retracted position and an extended position;
   wherein the drive sections are spring biased against each other into the extended position by a spring arrangement;
   wherein an end stop is provided to limit the drive motion between the drive sections to the extended position;
   wherein the end stop comprises a damping arrangement with a deformation zone, wherein during a drive motion into the end stop, depending on the speed of the drive motion, the damping arrangement damps the drive motion mainly based on plastic deformation of the deformation zone; and
   wherein the damping element is designed as a bushing that is plastically deformable along its axial extension by a drive motion for damping.

* * * * *